Sept. 14, 1965 K. C. SHERMAN 3,206,198
MECHANISM FOR SORTING AND DELIVERING BOWLING BALLS AND PINS
Filed Oct. 9, 1962 6 Sheets-Sheet 1

*INVENTOR.*
KENNETH C. SHERMAN
BY Morse T Altman

ATTORNEYS

Sept. 14, 1965 K. C. SHERMAN 3,206,198
MECHANISM FOR SORTING AND DELIVERING BOWLING BALLS AND PINS
Filed Oct. 9, 1962 6 Sheets-Sheet 2

INVENTOR.
KENNETH C. SHERMAN
BY Morse T Altman

ATTORNEYS

Sept. 14, 1965   K. C. SHERMAN   3,206,198
MECHANISM FOR SORTING AND DELIVERING BOWLING BALLS AND PINS
Filed Oct. 9, 1962   6 Sheets-Sheet 3
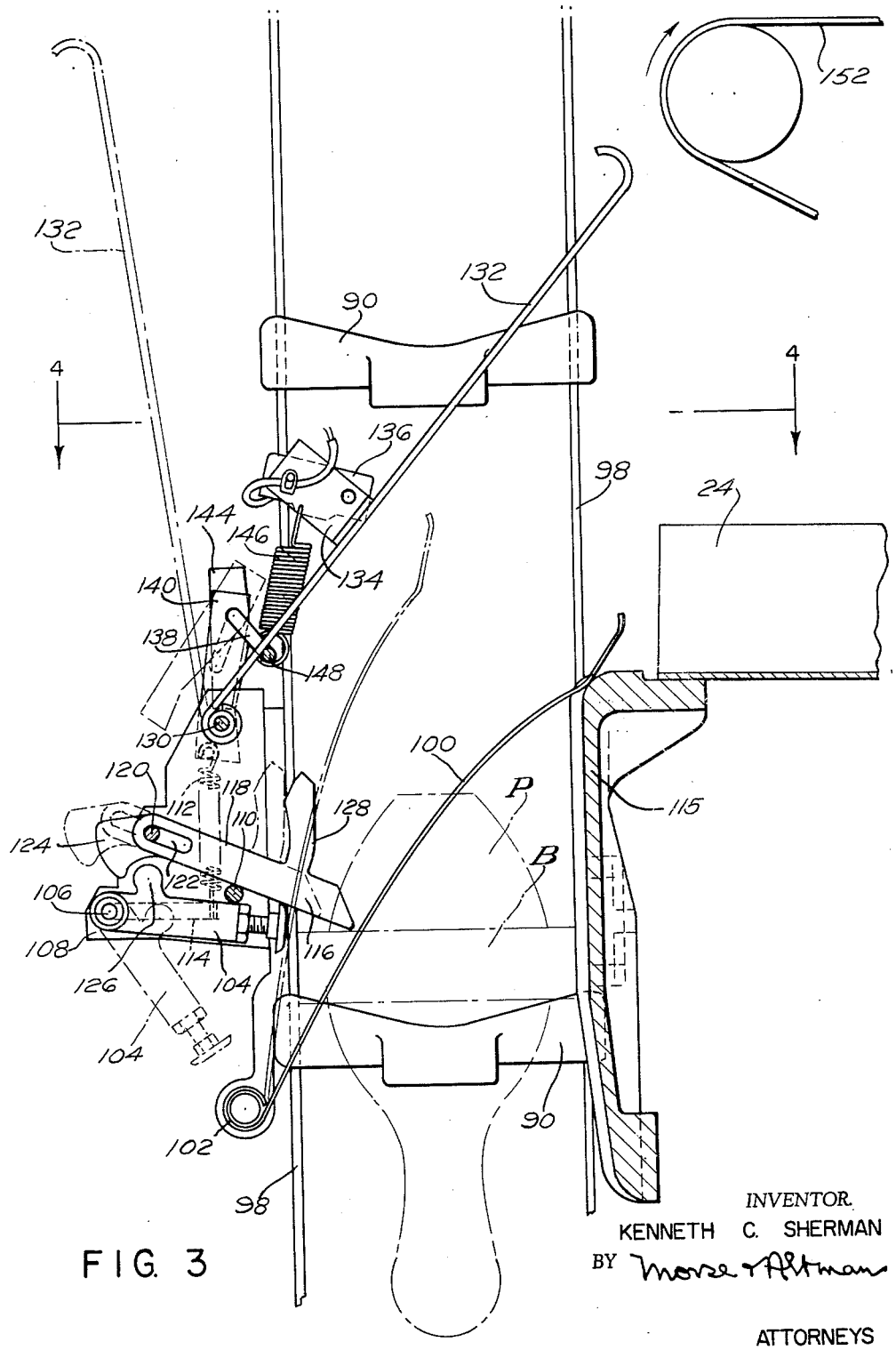
FIG. 3
INVENTOR.
KENNETH C. SHERMAN
BY 
ATTORNEYS Sept. 14, 1965 K. C. SHERMAN 3,206,198
MECHANISM FOR SORTING AND DELIVERING BOWLING BALLS AND PINS
Filed Oct. 9, 1962 6 Sheets-Sheet 5

INVENTOR.
KENNETH C. SHERMAN
BY Morse & Altman

ATTORNEYS

United States Patent Office 3,206,198
Patented Sept. 14, 1965

3,206,198
MECHANISM FOR SORTING AND DELIVERING
BOWLING BALLS AND PINS
Kenneth C. Sherman, Glen Burnie, Md.
(619 Beach Drive, Annapolis, Md.)
Filed Oct. 9, 1962, Ser. No. 229,333
9 Claims. (Cl. 273—43)

This invention relates to bowling pin-setting machines of the kind described and illustrated in my U.S. Patent No. 2,920,891, granted January 12, 1960. The invention relates more particularly to improvements in said machine which adapt it to handle "rubber duck" pins, that is, duck pins which are made with a thick circumferential band of rubber at the level of maximum diameter.

As hereinafter described, the pin-setting machine is provided with means associated with an elevator which lifts balls and pins from the alley pit for ejecting the balls onto a return run and for ejecting pins onto a conveyor belt in a magazine, the pins being uniformly oriented to be carried by the conveyor belts in the magazine bottom end first no matter whether they are right side up or upside down when they are brought up on the elevator. The magazine as described in said patent comprises three troughs successively connected at right angles to form three sides of a square. Each trough has on its floor a conveyor belt to carry the pins along to a discharge point where they are loaded one by one into the ten cups of a distributor which carries them into the relative positions they will have when deposited on the alley. The conveyor belts in the magazine run continuously while the distributor is operating to bring the cups succesively to a receiving position under the discharge point of the magazine so that the pins in the magazine will be advanced to the discharge point and be ready to be dropped into empty cups which are brought by the distributor to the receiving position. Continuous operation of the magazine belts when the pins therein are not being advanced and dropped into the cups results in excessive wear on the bands which encircle the pins and on the belts themselves. According to the present invention, mechanism is provided for stopping the driving of the belts except when the distributor is in operation or a pin is being ejected from the elevator into the magazine. In the latter case, the belts are operated sufficiently to advance the pins thereon a distance of one pin-length so that there will be no congestion of pins at the receiving end of the magazine.

For a more complete understanding of the invention, reference may be had to the following description thereof, and to the drawing, of which FIGURE 1 is a rear end elevation of a pin-setting machine incorporating the present invention;

FIGURE 3 is a side elevation, partly in section and on a larger scale, of the ball and pin ejecting mechanisms shown on FIGURE 1;

Figure 1:
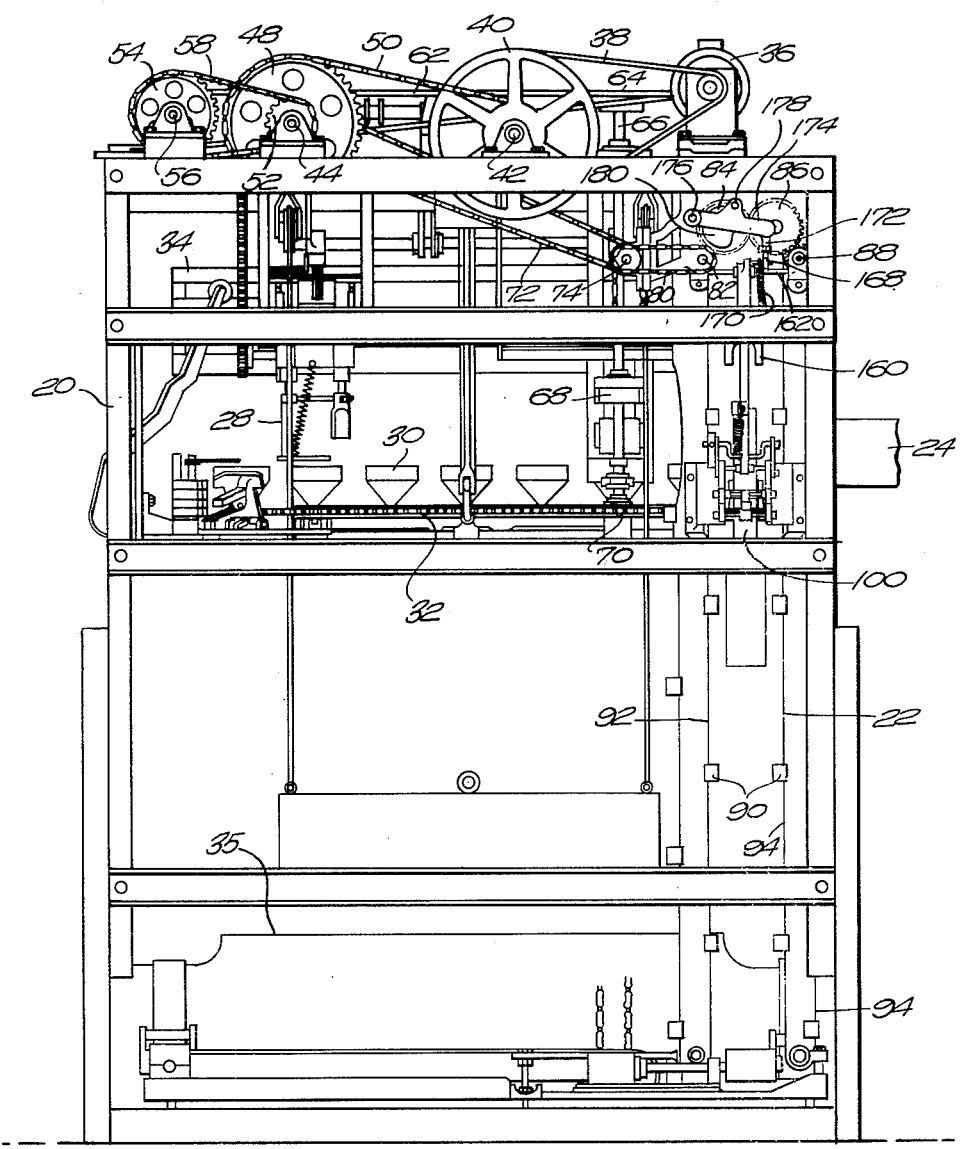
Figure 2:
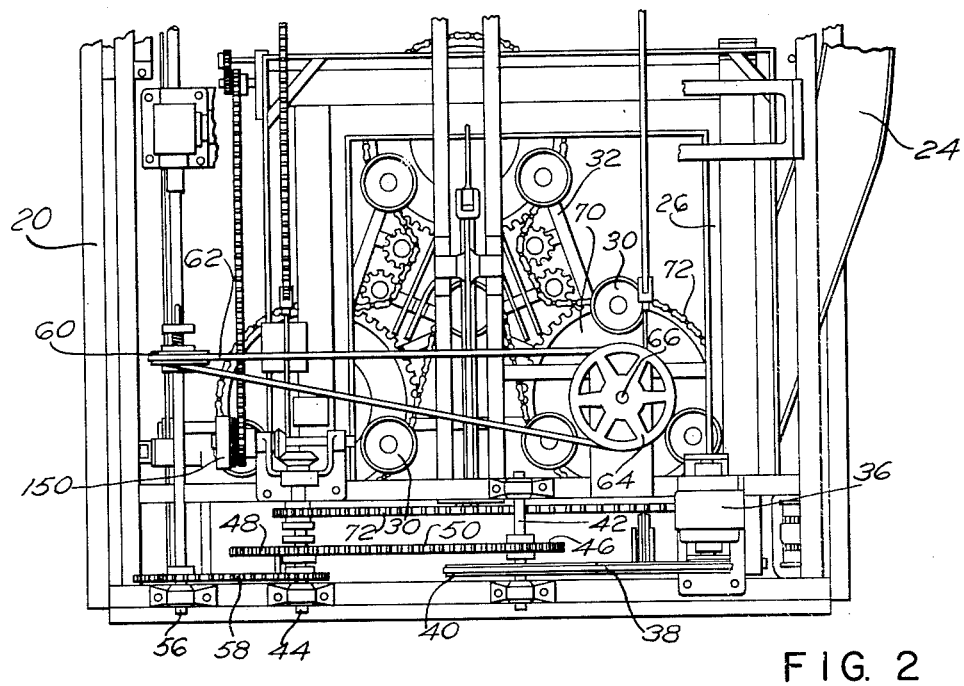
FIGURE 2 is a plan view of the rear half of the machine shown in FIGURE 1.
Figure 4:
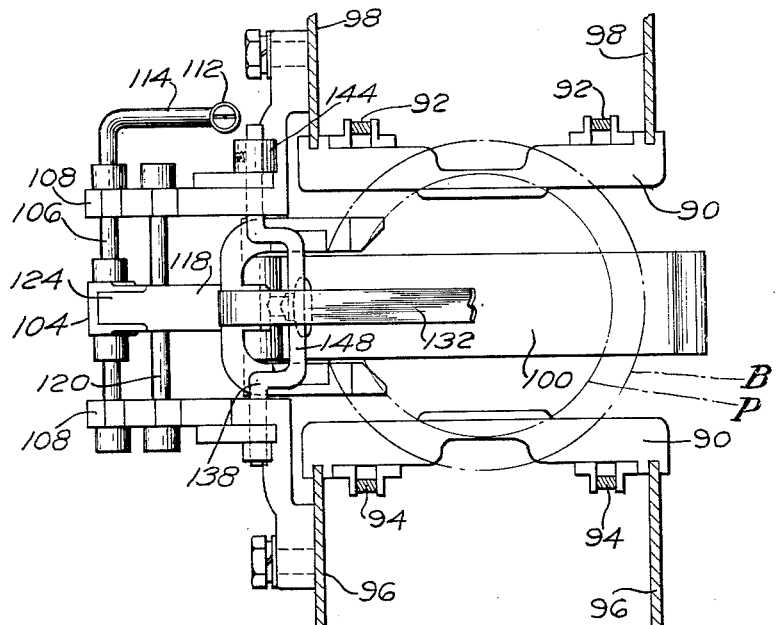
FIGURE 4 is a section on the line 4—4 of FIGURE 3.
Figure 5:
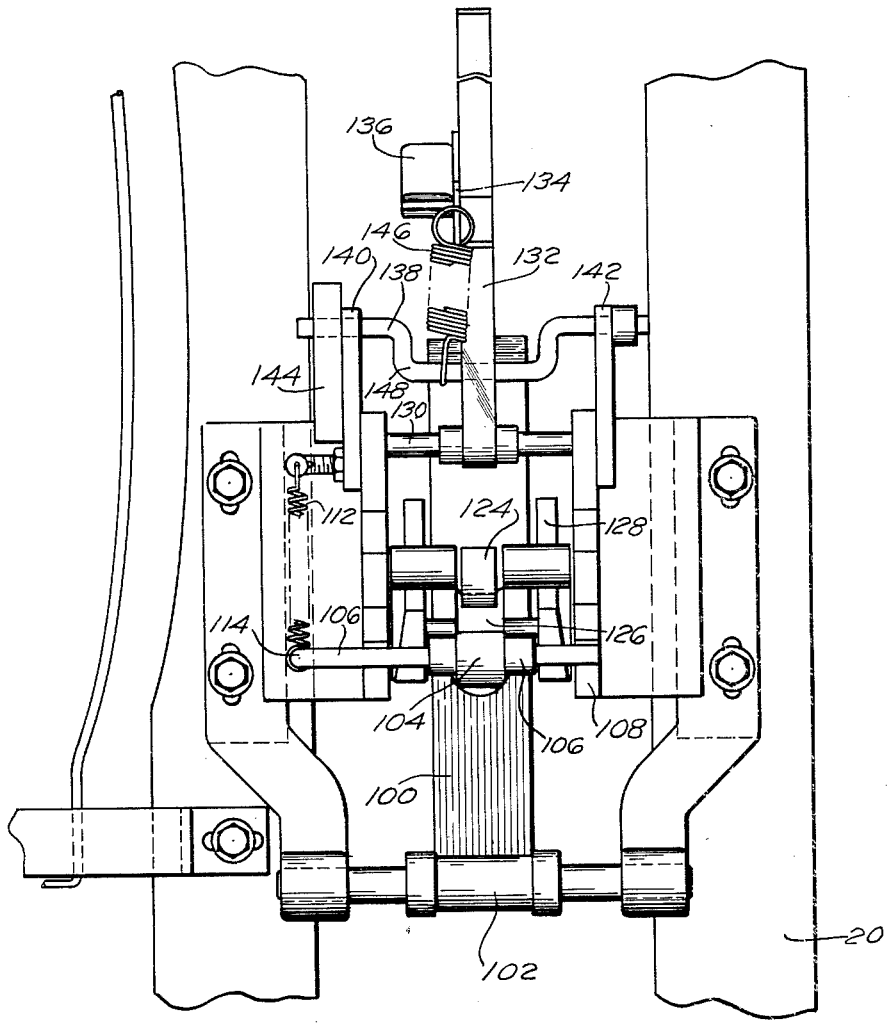
FIGURE 5 is a rear elevational view of the mechanism shown in FIGURES 3 and 4.

Described and illustrated in said U.S. Patent No. 2,920,891 is a bowling pin setting apparatus supported over the pit of a bowling alley and over the adjacent portion of the alley itself by a suitable frame 20. The balls and pins which get into the alley pit are carried by conveyor belts to an elevator 22 which picks them up one by one. From that elevator the balls are ejected onto a ball return 24 and the pins are ejected into a magazine 26 in which they are conveyed to a pin holder 28. They are dropped in succession into the holder as the previous pin in the holder is removed by one of the ten cups 30 of a distributor 32 which move in succession under the holder 28 when the distributor is operating. When all the cups of the distributor have received pins, the distributor moves forward to a position directly beneath a rack 34 which has grippers and descends to grip the pins. The rack 34 then lifts the pins from the cups 30, the distributor 32 moves back to its former position, and the rack 34 descends to deposit the pins on the alley surface 35. All the moving parts of the apparatus are driven by power from an electric motor 36 which is connected by a belt 38 to a wheel 40 on a shaft 42 which turns at a slower speed than the motor shaft. A shaft 44 is driven at a still slower speed by sprocket wheels 46, 48 connected by a chain 50. Sprocket wheels 52 and 54 on shafts 44 and 56, respectively, are connected by a chain 58. A pulley wheel 60 on the shaft 56 is connected by a belt 62 to a horizontal wheel 64 on a vertical shaft 66. A magnetic clutch 68, when energized, connects the shaft 66 to a sprocket wheel 70 which is a part of the distributor 32.

The elevator 22 is constantly driven from the shaft 44 by a chain 72 which turns a shaft 74 connected by sprocket wheels and a chain 80 to a shaft 82. On this shaft is a pinion (not shown) which is connected by meshing gear wheels 84, 86 to a similar pinion on a shaft 88 so that the shafts 82 and 88 rotate at the same speed but in opposite directions. These shafts operate the elevator 22 which is conventionally indicated in FIGURE 1 and consists of two sets of lift bars 90 carried by endless chains 92 and 94, there being two chains for each set of lift bars, all four chains having an ascending portion and a descending portion. The lift bars 90 are uniformly spaced on the chains and those on the ascending portions of the chains run on vertical rails 96, 98 to hold the opposing lift bars properly spaced apart so that each pair of lift bars can support a ball or pin between them.

To sort the balls from the pins, a leaf spring 100 is hinged at its lower end 102 to the main frame 20 at the rear of the elevator 22. Behind this spring is a stop member 104 mounted at its rear end on a shaft 106 which is rockable in brackets 108. The stop member 104 is normally held up in its active position against a fixed pin 110 by a spring 112 which is attached to an angled extension 114 of the shaft 106. When a ball is brought up by a pair of lift bars 90, it rocks the spring 100 back to the position shown in broken lines in FIGURE 3 in which position the spring extends upward and forward into the path of a rising ball, further rocking movement being prevented by the stop 104. Further upward movement of the ball flexes the upper portion of the spring, which presses the ball forward against a vertical guide member 115 until the ball reaches the level of the return chute 24, whereupon the flexed spring 100 pushes the ball from the elevator into the chute 24.

Figure 6:
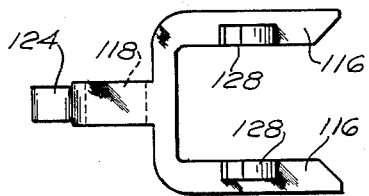
FIGURE 6 is a plan view, on a larger scale, of one of the parts shown in FIGURES 3, 4, and 5.

When a pin P is brought up by the elevator, it starts to rock the spring 100 back, but before the spring reaches the stop 104, the band B around the body of the pin P engages the prongs 116 of a lever in the form of a fork 118 (FIGURE 6). The fork is rockable about a fixed rod 120 which extends through a slot 122 in the shank of the fork. A claw 124 is an extension of the shank of the fork. When a pin P on the elevator 22 reaches the position indicated in broken lines in FIGURE 3, the band B engages the prongs 116 of the fork and rocks the fork about the rod 120. This causes the claw 124 to engage a knob 126 on the stop member 104, rocking the stop member 104 down to the inactive position indicated in broken lines. The spring 100 is thus permitted to swing back out of the way unopposed, permitting the pin P to continue upward. It should be noted that when a ball engages the prongs 116 of the fork, the spherical surface of the ball pushes the fork rearward as permitted by the slot 122 so that the claw is moved out of range of the knob 126, leaving the stop member 104 in its active position. Ordinarily the fork 118 will return to the forward position shown in FIGURE 3 after it has been pushed rearward by a rising ball, but in case it does not do so, upstanding horns 128 are provided on the prongs 116. The rear edges of these horns are shaped so that when a pin P is brought up by the elevator and rocks the fork 118, if it is in its forward position, the rear edges of the horns clear the shaft 130, but if the fork 118 is in its rearward position, the horns engage a shaft 130 and start to slide past it. This cams the fork forward with respect to the rod 120 so that the claw engages the knob 126 and swings the stop member 104 down to its inactive position. When a pin P has moved above the fork prongs 116 and the spring 100, the spring 112 pulls the stop member 104 up to its active position and causes the ball spring 100 to rock forward to its normal position of rest.

Figure 7:
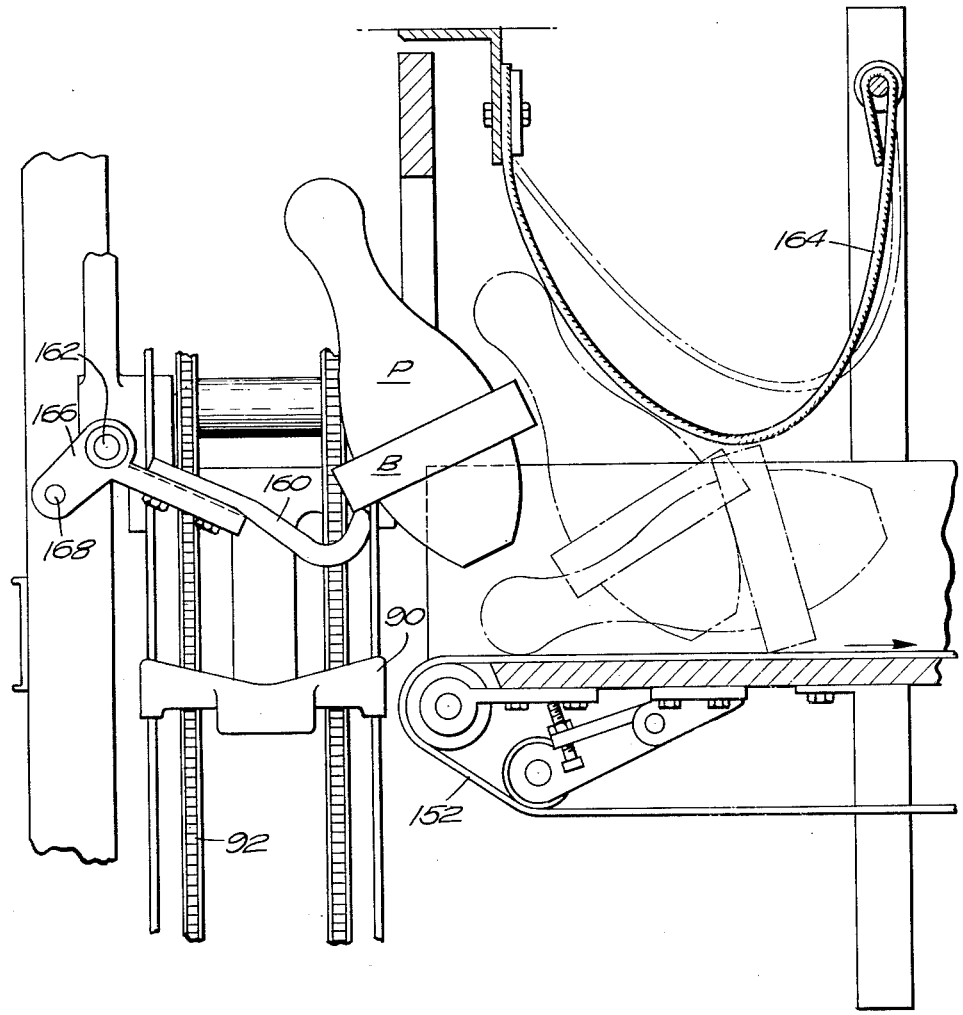
FIGURE 7 is a fragmentary sectional view showing an upright pin being kicked from the elevator to the magazine.

By this time, the rising pin P has engaged a feeler in the form of a light spring arm 132 which normally extends from the rock shaft 130 forward across the path of the rising pin. The feeler 132 carries a bracket 134 with a mercury switch 136 thereon which is open when the arm is in its normal forward position. When a pin P rocks it back, a snap-action mechanism snaps the arm back to the retracted position shown in broken lines in FIGURE 3, clear of the path of the rising pins, and retains the feeler in this retracted position. The snap-action mechanism consists of a crank-wire 138, the end portions of which extend rockably through two brackets 140, 142 secured to the main frame. A block 144 is fixed on one end of the wire 138 to rock therewith. A tension spring 146 extends from the offset portion 148 of the wire to the bracket 134. When the parts are in the normal position shown in FIGURE 3, the spring 146 tends to rock the crank-wire 138 counterclockwise, pressing the lower end of the block 144 against part of the main frame. When the feeler 132 is rocked back by a pin P until the spring 146 moves back of the rocking axis of the crank-wire 138, the feeler 132 is snapped back to the position shown in broken lines by the spring 146, thus closing the mercury switch 136. At the same time, the crank-wire is rocked clockwise so that the block 144 rocks forward to the position shown in broken lines. By this time the lift bars 90 carrying the pin P have moved upward beyond the level of the block 144. The closing of the mercury switch 136 closes a circuit which energizes a magnetic clutch 150 to connect the three conveyor belts in the magazine 26 to the constantly rotating shaft 44, the first of these belts 152 being indicated in FIGURES 3, 7 and 8. If the belts are not already running, this starts them just in time to receive the pin P when it is ejected from the elevator as hereinafter described. If the next pair of lift bars 90 come without a pin P thereon, one of them knocks the upper end of the block 144 which had been rocked into its path, and rocks it and the crank-wire 138 back to their normal position. The offset portion 148 of the crank-wire moves the spring 146 forward past the axis of the crank-wire so that the spring now snaps the feeler 132 back to its forward position and opens the mercury switch 136, stopping the magazine conveyor belts unless the magnetic clutch is at the time energized by some other circuit. If, however, the next pair of lift bars are carrying a pin, the pin obstructs the feeler 132 and prevents it from returning to its open-switch position, so that magazine belts continue to run until lift bars arrive without a pin thereon. Thus each time a pin P is brought up to the ejection level, the magazine belts are operated just enough to make room for it at the receiving end of the magazine.

The pins P in the pit are brought by the conveyor belts in the pit to the elevator at random, that is, either butt first or head first. Hence the elevator brings the pins up, some inverted and some right side up. Since it is important that all the pins in the magazine be advanced butt first, the ejecting apparatus by which the pins are transferred from the elevator to the magazine is designed to orient them properly in the process of transferring them. For this purpose, a kicker 160, preferably in the shape of a fork, is pivoted at 162 and is swung constantly across the interior of the elevator in timed relation with the arrival of successive pairs of lift bars 90 at the proper point for the ejection of the pin P carried thereby. If the rising pin P is upright, as in FIGURE 7, the fork 160 swings out, strikes the underbody of the pin below the band B, and kicks the pin forward onto the belt 152. Since the impulse is applied to the lower part of the pin, there is a resultant tendency on the part of the pin to turn backward so that when the pin lands on the belt 152 the butt end will be foremost, as it should be. To ensure the backward turn, a loop 164 of canvas or other heavy flexible material is suspended over the entering end portion of the magazine. If a pin should start to fall forward when ejected by the fork 160, its head would engage the loop 164 and would be bounced back so that the butt would be leading when the pin landed on the belt 152.

Figure 8:
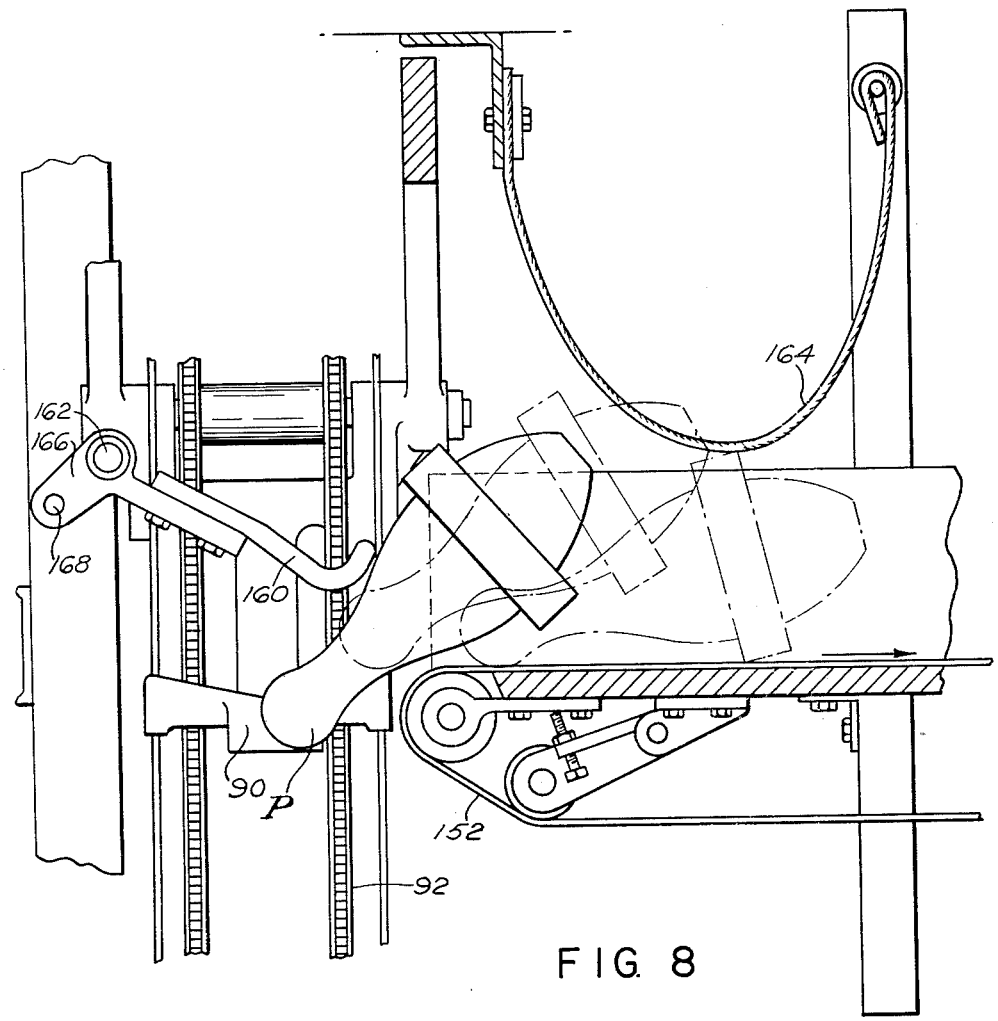
FIGURE 8 is a fragmentary sectional view showing an inverted pin being kicked from the elevator to the magazine.
Figure 9:
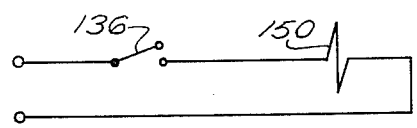
FIGURE 9 is a wiring diagram of a control circuit for a conveyor.

When an inverted pin P is brought up by the elevator, the kicker 160 strikes the upper body of the pin which is then below the band B and tosses the pin onto the belt butt first as indicated in FIGURE 8.

For the operation of the kicker 160, an arm 166 integral therewith carries a small pin 168 to which is attached a spring 170 (FIGURE 1) and a link 172. The latter connects the arm 166 to the end of a lever 174 which is pivoted at 176 and carries a cam follower 178. The cam follower bears against the edge of a disc cam 180 mounted on the gear wheel 84. The cam 180 acts through the lever 174 and link 172 to retract the kicker 160 periodically in time with the movement of the lift bars and to release the kicker 160 for quick but yielding ejecting movements by the spring 170.

I claim:

1. In a pin-setting machine having a main frame, an elevator supported by said frame with lift-bars for raising balls and pins one by one, a pin magazine having an entrance end adjacent to said elevator, said magazine comprising a trough with a conveyor belt at its bottom, a motor for driving said belt and other moving parts of the machine, and clutch means electrically operated to connect and disconnect said belt and said motor; a feeler rockably supported by said frame normally in the path of pins on the elevator and engageable by each such pin as it approaches the level of the magazine entrance, a normally open electric switch in series with said clutch means and operable by said feeler to close when the feeler is moved from its normal position by an ascending pin and to open when the feeler moves back to its normal position, and snap-action means operating when said feeler is rocked by contact with an ascending pin to move said feeler quickly to a retracted position clear of the path of said pin and to retain said feeler releasably in said retracted position, said snap-action means including a block engageable by one of the next pair of ascending lift-bars to rock said feeler to its normal position if no pin is carried by said last mentioned lift-bars.

2. Mechanism as described in claim 1, said feeler being pivoted at its lower end at the rear of the elevator, said feeler normally extending upward and forward from its pivot across the path of ascending pins carried by the elevator.

3. Mechanism as described in claim 2, said normally open electric switch being a mercury switch mounted on said feeler to close when the feeler rocks rearwardly out of the path of the pins on the elevator and to open when the feeler rocks forward to its normal position.

4. In a pin-setting machine having a main frame, an elevator supported by said frame for raising balls and rubber-banded pins one by one, a ball return chute having an entrance end adjacent to said elevator at the forward side thereof, and a pin magazine having a receiving end adjacent to said elevator at a higher level than said chute; mechanism for selectively ejecting into said chute balls brought up by said elevator, said mechanism comprising a leaf spring having its lower end pivotally mounted at the rear of said elevator at a level below that of the entrance to the chute and rockable by contact with an ascending pin from a forwardly sloping position in the path of balls and pins ascending on the elevator to a rearward position clear of said path, a stop member normally in an active position for engagement by said spring to prevent rearward rocking movement of the spring to a position clear of said path, and means controlled by upward movement of a rubber-banded pin on the elevator to move said stop member to an inactive position, whereby said spring is permitted to rock to said rearward position.

5. In a pin-setting machine having a main frame, an elevator supported by said frame for raising balls and rubber-banded pins one by one, a ball return chute having an entrance end adjacent to said elevator at the forward side thereof, and a pin magazine having a receiving end adjacent to said elevator at a higher level than said chute; mechanism for selectively ejecting into said chute balls brought up by said elevator and permitting rubber-banded pins brought up by the elevator to pass said chute, said mechanism comprising a leaf spring having its lower end pivotally mounted on said main frame at the rear of said elevator and at a level below that of the entrance to said chute, a stop member mounted on said frame at the rear of said elevator and rockable from an inactive position to an active position for engagement with said spring near its pivot to limit rearward rocking movement of said spring to a position in which it slopes upward and forward into the path of balls being brought up by the elevator, the upper portion of said spring being opposite the entrance to said chute, a rigid guide member extending down from the entrance to said chute opposite said spring, spring means yieldingly holding said stop member in its active position and a lever carried by said frame above said stop member, said lever being movable longitudinally a limited distance forward and rearward and rockable when in its forward position to move said stop member to the inactive position, said lever when in its forward position being engageable by a ball on the elevator to be pushed to its rearward position whereby said leaf spring is maintained by said stop member in the path of the ball to eject the ball from the elevator when the ball reaches the level of the entrance of the return chute, said lever being engageable by a rubber-banded pin on the elevator to be rocked to move said stop member to its inactive position whereby said leaf spring can rock to the rear to let the pin pass.

6. Mechanism as described in claim 5, said lever being in the form of a fork having two prongs extending into the path of balls and pins on the elevator.

7. Mechanism as described in claim 6, said lever having a slot therethrough near its rear end, and a fixed horizontal rod mounted on the main frame and passing through said slot.

8. Mechanism as described in claim 7, each prong of said fork lever having an upstanding horn thereon with a cam surface thereon, and a fixed element on said main frame engageable by the cam surfaces on said horns when the lever is rocked upward by a pin brought up by the elevator to shift said lever forward.

9. Mechanism as described in claim 5, said elevator having uniformly spaced pairs of lift bars to support individual balls and pins, a kicker rockably mounted at its upper end on said frame at the rear of the elevator and opposite the receiving end of said magazine, and power-driven means oscillating said kicker in timed relation to the movement of said lift bars to swing forward into the interior of the elevator and upward under each pair of passing lift bars whereby to toss a pin carried by the lift bars into the end of the magazine.

References Cited by the Examiner

UNITED STATES PATENTS

| 1,692,796 | 11/28 | Bishop | 273—43 |
| 2,692,139 | 10/54 | Dumas | 273—43 |
| 2,920,891 | 1/60 | Sherman | 273—43 |
| 2,985,283 | 5/61 | Carter | 198—232 |
| 2,990,176 | 6/61 | Smiley et al. | 273—43 |
| 3,064,973 | 11/62 | Russo | 273—43 |
| 3,093,373 | 6/63 | Russo | 273—43 |
| 3,097,847 | 7/63 | Di Stefano et al. | 273—43 |

DELBERT B. LOWE, *Primary Examiner.*